United States Patent
Boone et al.

(10) Patent No.: US 9,749,335 B2
(45) Date of Patent: *Aug. 29, 2017

(54) SECURE, NON-DISRUPTIVE FIRMWARE UPDATING

(71) Applicants: Pieter-Jan Boone, Bedford, MA (US); Lou Bergandi, Oceanside, CA (US); Feroz Gora, Boston, MA (US); David Kashtan, Santa Cruz, CA (US); David M. T. Ting, Sudbury, MA (US); Michael Michlin, Newton, MA (US); Robert Calder, Burlington, MA (US); Alain Slak, Bedford, MA (US); Taras Lushney, Lviv (UA)

(72) Inventors: Pieter-Jan Boone, Bedford, MA (US); Lou Bergandi, Oceanside, CA (US); Feroz Gora, Boston, MA (US); David Kashtan, Santa Cruz, CA (US); David M. T. Ting, Sudbury, MA (US); Michael Michlin, Newton, MA (US); Robert Calder, Burlington, MA (US); Alain Slak, Bedford, MA (US); Taras Lushney, Lviv (UA)

(73) Assignee: IMPRIVATA, INC., Lexington, MA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/886,462

(22) Filed: Oct. 19, 2015

(65) Prior Publication Data

US 2016/0044046 A1    Feb. 11, 2016

Related U.S. Application Data

(63) Continuation of application No. 14/055,527, filed on Oct. 16, 2013, now Pat. No. 9,189,225.

(Continued)

(51) Int. Cl.
*G06F 9/44* (2006.01)
*G06F 9/445* (2006.01)
(Continued)

(52) U.S. Cl.
CPC .............. *H04L 63/105* (2013.01); *G06F 8/65* (2013.01); *G06F 8/665* (2013.01); *G06F 8/71* (2013.01);
(Continued)

(58) Field of Classification Search
CPC ....... H04L 67/42; H04L 63/20; H04L 63/105; G06F 8/65; G06F 8/61; G06F 8/665; G06F 8/71; G06F 21/572
See application file for complete search history.

(56) References Cited

U.S. PATENT DOCUMENTS

| 7,904,895 B1 | 3/2011 | Cassapakis et al. |
| 8,190,869 B2 | 5/2012 | Booth et al. |

(Continued)

FOREIGN PATENT DOCUMENTS

WO    WO-2012065894 A2    5/2012

OTHER PUBLICATIONS

Li et al., VIPER: verifying the integrity of PERipherals' firmware, Oct. 2011, 14 pages.*

(Continued)

*Primary Examiner* — Thuy Dao
(74) *Attorney, Agent, or Firm* — Morgan, Lewis & Bockius LLP

(57) ABSTRACT

Firmware updates for, e.g., thin client devices may be achieved in a seamless, non-disruptive manner using a two-stage firmware loader, including a base loader pre-installed on the device and a caching loader downloaded, by the base loader, from a firmware server and thereafter (Continued)

responsible for downloading and updating other firmware application packages.

23 Claims, 4 Drawing Sheets

Related U.S. Application Data

(60) Provisional application No. 61/714,548, filed on Oct. 16, 2012.

(51) Int. Cl.
    *G06F 21/57*     (2013.01)
    *H04L 29/06*     (2006.01)
    *H04L 29/08*     (2006.01)

(52) U.S. Cl.
    CPC ........ *G06F 21/572* (2013.01); *H04L 63/0823* (2013.01); *H04L 63/20* (2013.01); *H04L 67/2842* (2013.01)

(56) References Cited

U.S. PATENT DOCUMENTS

| | | | |
|---|---|---|---|
| 8,224,885 B1 | 7/2012 | Doucette et al. | |
| 8,386,800 B2* | 2/2013 | Kocher | G06F 21/602 380/277 |
| 8,661,429 B2 | 2/2014 | Ruster et al. | |
| 8,707,052 B2* | 4/2014 | Kocher | G06F 21/602 380/277 |
| 8,856,771 B2 | 10/2014 | Chalmers et al. | |
| 8,869,138 B2 | 10/2014 | Bandakka et al. | |
| 8,887,144 B1* | 11/2014 | Marr | G06F 8/65 713/2 |
| 8,910,868 B1 | 12/2014 | Wade et al. | |
| 9,009,357 B2* | 4/2015 | Asnaashari | G06F 3/0605 710/8 |
| 9,015,694 B2* | 4/2015 | Gray | G06F 8/665 717/170 |
| 9,189,631 B2* | 11/2015 | Liu | G06F 21/572 |
| 9,210,140 B2* | 12/2015 | Pope | G06F 21/572 |
| 9,479,332 B2* | 10/2016 | Ballesteros | G06F 12/1408 |
| 9,558,353 B2* | 1/2017 | Marino | G06F 21/56 |
| 2006/0068897 A1 | 3/2006 | Sanford et al. | |
| 2008/0091824 A1 | 4/2008 | Patel et al. | |
| 2008/0168435 A1 | 7/2008 | Tupman et al. | |
| 2009/0198618 A1* | 8/2009 | Chan | G06Q 20/02 705/66 |
| 2010/0011200 A1* | 1/2010 | Rosenan | G06F 21/575 713/2 |
| 2010/0222132 A1 | 9/2010 | Sanford et al. | |
| 2011/0093843 A1* | 4/2011 | Endo | G06F 8/65 717/170 |
| 2011/0257941 A1 | 10/2011 | Magro et al. | |
| 2012/0102477 A1 | 4/2012 | Kim et al. | |
| 2012/0124357 A1* | 5/2012 | Zimmer | G06F 1/3203 713/2 |
| 2012/0173732 A1 | 7/2012 | Sullivan | |
| 2012/0198434 A1 | 8/2012 | Dirstine et al. | |
| 2012/0226998 A1 | 9/2012 | Friedl et al. | |
| 2013/0173475 A1 | 7/2013 | Lund | |
| 2013/0185563 A1 | 7/2013 | Djabarov et al. | |
| 2015/0149783 A1* | 5/2015 | Clark | H04L 9/3263 713/175 |

OTHER PUBLICATIONS

Castillo et al., A secure self-reconfiguring architecture based on open-source hardware, 2005, 7 pages.*

"Dell Wyse Cloud Client Computing for Vmware," available online at http://www.wyse.com/sites/default/files/solutions/briefs-2012-05/Dell-Wyse-VMware-Solutions_SB.pdf (last accessed on Oct. 16, 2013).

"Dell Wyse P20 and No Click Access," available online at http://www.wyse.com/sites/default/files/solutions/briefs-2012-05/Dell-Wyse-P20-NoClick_SB.pdf (last accessed on Oct. 16, 2013).

"Smart Zero Clients Simple Management," available online at http://www8.hp.com/us/en/hp-information/thin-client-solutions/smart-zero-clients.html (last accessed on Oct. 16, 2013).

"PCoIP zero clients enable the ultimate virtual desktop and remote workstation experience," available online at http://www.teradici.com/pcoip-solutions/zero-clients/overview.php (last accessed on Oct. 16, 2013).

Chitnis, Nikhil et al, "Going Green With Virtualization," SETLabs Briefings, vol. 9, No. 1, pp. 31-38 (2011).

Kim et al., "Remote Progressive Firmware Update for Flash-Based Networked Embedded Systems", Aug. 2009, 6 pages.

Li et al., FEMU: A firmware-Based Emulation Framework for SoC Verification, Oct. 2010, 10 pages.

* cited by examiner

SECURE, NON-DISRUPTIVE FIRMWARE UPDATING

CROSS-REFERENCE TO RELATED APPLICATION

The present application is a continuation of U.S. patent application Ser. No. 14/055,527, filed Oct. 16, 2013, which claims priority to and the benefit of U.S. Provisional Application No. 61/714,548, filed on Oct. 16, 2012, each of which is hereby incorporated herein by reference in its entirety.

TECHNICAL FIELD

The invention relates generally to systems and methods for remote updating of software, and in particular to updating of firmware and other components in a secure, non-disruptive fashion.

BACKGROUND

Traditional personal computers (PCs) are being replaced with simpler devices in "mission-critical" environments such as healthcare. So-called terminal devices provide only basic presentation (display), networking, and device-redirection services (to support, for example, keyboard, mouse, audio, and USB devices) for server-based computing—i.e., architectures in which a sophisticated remote server supplies applications or even entire desktops to the terminal device. The user interacts with the server-provided functionality via "receiver" or "terminal-emulation" software (or firmware) running on the terminal device, ideally rendering the experience indistinguishable from using local applications running on a conventional PC. The trend favoring these "thin" or "zero" client devices is driven by the desire to eliminate data at the edge of a computer network where it is vulnerable to compromise; to centralize the management of computing resources on highly available hardware; and to simplify management and support of the endpoint devices.

Thin clients may utilize system-on-chip (SOC) designs, which allow hardware device vendors to incorporate all the necessary computing, display, networking, audio, video, and USB device capabilities into one low-cost integrated circuit capable of running directly from "firmware"—i.e., basic system-level programming—stored on non-volatile (e.g., flash) memory. Firmware delivered by the hardware vendor typically comprises the base operating system (such as LINUX, UNIX, RTOS, etc.) combined with specialized programming that facilitates interfacing with device components for display management, 2D/3D graphics, imaging, and audio-visual coder/decoders (codecs), and supports external devices attached by the user (e.g., via USB ports). Terminal-emulation programs furnished with the thin client support a rich user experience through remote interaction with applications actually executing on the back-end servers; these programs use networks protocols such as RDP (Remote Desktop Protocol), ICA (Independent Computing Architecture) or PCoIP (PC over IP).

Ideally, firmware delivered on a thin client device remains up-to-date for the life of the hardware with no need to "re-flash" (i.e., remotely replace the firmware via a computer network). This frees local information-technology (IT) support personnel from managing installed firmware. In reality, however, firmware is periodically updated to fix bugs or to support new features or devices. Moreover, for certain types of firmware applications, the ability to modify the firmware is desirable for the purposes of ensuring proper functioning and/or customizing the applications. This is especially relevant for user-authentication-service (UAS) firmware that runs on the SOC to validate a user's identity prior to launching the terminal-emulation program with the correct user credentials. Because the UAS firmware generates the user interface (UI), both intermediate resellers and end-user customers often seek to customize the UAS in order to promote their own corporate branding, e.g., to display a hospital's mission or corporate logo when the device is in its ready state waiting for a user to log on. This requires the firmware to be field-modified for each customer—an impossibility for device-provided firmware. In addition, since the UAS is the authentication point for the entire system (all the way to the server hosting the desktop and end-user applications), the integrity of the firmware should be verifiable at any time to ensure that it has not been compromised.

The hardware vendor that supplies the client device typically facilitates updating the firmware via a management console that broadcasts new firmware versions to customers (in accordance with the maintenance policy in effect) and manages their installation remotely. This procedure performs a complete update of the firmware while optionally preserving settings or personalization already applied. But it leaves the hardware vendor in charge of when these updates occur. Moreover, a full upgrade to the system firmware can impose a considerable amount of down time since the device is inoperable during the upgrade—and particularly in fast-paced environments such as healthcare facilities, such delays may not be tolerable.

SUMMARY

Embodiments of the present invention facilitate seamless and secure updating of system firmware (and/or software) in a manner that minimizes downtime and disruption to the end user. The hardware vendor's firmware may support a secure loader whose task is to check a firmware server for updates of installed applications (such as, e.g., firmware controlling authentication) used by the thin client device. When the loader detects a new release, it downloads and verifies the firmware and the update policy as a package. It may also manage a local cache of the current and updated version within the SOC, and at a time when the device is considered quiescent, switch to using the newer version in a non-disruptive manner. (As used herein, the term "firmware" refers to any basic programming held in non-volatile memory of a thin client device, such as erasable programmable read only memory (EPROM) or flash memory. In some embodiments, "firmware" refers to programming, regardless of its function or the type of non-volatile memory on which it is stored, that is not ordinarily modifiable by the user.)

A representative architecture utilizes a two-stage loader to manage updating the firmware. A base or "primordial" loader is shipped with the hardware vendor's firmware and configured (via the hardware vendor's hardware-management tool) to access (e.g., via an IP address) the firmware server. In various embodiments, the base loader is automatically launched on first-time startup by the device's operating system as part of the boot script. It may also be used during a "factory restore" to reset the device to its original (factory) state. The base loader may be configured to download a caching loader, which thereafter handles the initial download of other firmware applications and/or subsequent downloads of newer packages (including itself) from the firmware server. The caching loader may also manage the local cache of current-version firmware in use and orchestrate the transition between versions. A digital certificate or other verification mechanism stored on the SOC may be used by the base and caching loaders to ensure that only legitimate (e.g., signed) packages from the firmware server are accepted by the device.

In one aspect, the invention pertains to a thin client device including a processor, writable, nonvolatile memory, one or more peripheral devices facilitating interaction with a user, and a network interface. In various embodiments, the memory stores a digital certificate and firmware instructions, executable by the processor, that define a self-launching base loader and a caching loader. The base loader, when executed by the processor, causes (A) communication, via the network interface, with the remote firmware server, (B) downloading for storage, in the nonvolatile memory, of the caching loader, and (C) verification of the caching loader based on the digital certificate. The caching loader, when executed by the processor, causes (A) communication, via the network interface, with a remote firmware server, (B) identification of one or more firmware applications needed by the client device but not stored thereon, (C) downloading for storage, in the nonvolatile memory, of the identified firmware application(s), (D) verification of the firmware application(s) based on the digital certificate, (E) identification of one or more newer versions of the firmware application(s) following initial download thereof, (F) and management of the transition, on the thin client device, to the downloaded newer version(s). The caching loader may further cause downloading of a manifest from the firmware server; the identification of the firmware application(s) needed by the thin client device is then at least in part based on the manifest.

In some embodiments, the thin client device further includes one or more authentication devices (e.g., a fingerprint reader, a card reader, and/or an RFID reader), and the downloaded firmware application(s) include a user authentication services application for execution by the processor to authenticate a user via the authentication device(s). Further, in some embodiments, the thin client includes a terminal emulation program executable by the processor to establish communication, via the network interface, with a remote application-hosting server for facilitating interaction, via the peripheral device of the thin client, with at least one application executing on the remote server; the user authentication services application may restrict operation of the terminal emulation program prior to authentication of the user via the authentication device.

The caching loader may be configured to manage the transition to the downloaded newer version(s) of the firmware application(s) by restricting deployment of the newer version(s) and override of corresponding previous version(s) in accordance with a policy. The policy may require the transition to occur, e.g., only between specified times of the day or specified days of the week, only when no log-on activity has occurred during a pre-set interval, only when the rate of new log-ons within a time window falls below a pre-set threshold, immediately following the termination of a user session, or, in other embodiments, immediately. Further, the caching loader may be configured to cause the transition to the downloaded newer version of the firmware application by displaying an alert screen, shutting down a previous version of the at least one firmware application, and thereafter starting the newer version.

In another aspect, the invention is directed to a method of managing firmware on a thin client device. The method involves executing, by a processor of the thin client device, a base loader stored in nonvolatile memory of the thin client device to download, from a remote firmware server, a caching loader for nonvolatile storage on the thin client device. Further, it involves, executing, by the processor, the caching loader to (i) identify, via the remote firmware server, one or more firmware application(s) needed by the thin client device but not stored thereon and download the identified firmware application(s) for nonvolatile storage on the thin client; (ii) verify the firmware application(s) based on a digital certificate; (iii) identify, via the remote firmware server, one or more newer versions of the firmware application(s) following initial download thereof and download the newer version(s) of the firmware application(s) for storage in the nonvolatile memory; (iv) verify the at least one newer version based on the digital certificate; and (v) manage the transition to the downloaded newer version(s) of the firmware application(s). In some embodiments, the caching loader identifies the newer version(s) of the firmware application(s) by downloading a manifest from the firmware server.

The thin client may include one or more authentication devices, and the method may further include executing, on the thin client, a user authentication services application to authenticate a user via the authentication device(s). Further, the method may involve executing a terminal emulation program on the thin client to establish communication, via the network interface, with a remote application server for facilitating interaction, via a peripheral device of the thin client, with at least one application executing on the remote server; and restricting operation of the terminal emulation program prior to authentication of the user via the at least one authentication device.

Managing the transition to the downloaded newer version(s) of the firmware application(s) may include restricting deployment of the newer version(s) and/or override of one or more corresponding previous version(s) of the firmware application(s) in accordance with a policy. In various embodiments, the policy requires the transition to occur only between specified times of the day or specified days of the week, only when no log-on activity has occurred during a pre-set interval, only when the rate of new log-ons within a time window falls below a pre-set threshold, immediately following the termination of a user session, or immediately. Managing the transition to the downloaded newer version(s) of the firmware application(s) may include displaying an alert screen, shutting down a previous version of a firmware application, and thereafter starting the newer version.

Another aspect of the invention is directed to a system for managing firmware on a thin client device, the system including a firmware server and a client device. The firmware server stores (i) a caching loader including processor-readable firmware instructions, and (ii) one or more firmware application(s). The client device may include (i) one or more peripheral devices facilitating interaction with a user, (ii) a processor, (iii) a network interface, and (iv) writable, nonvolatile memory storing a digital certificate and a self-launching base loader comprising processor-readable firmware instructions. When executed by the processor, the base loader causes communication, via the network interface, with the firmware server and facilitates downloading of the caching loader for storage in the nonvolatile memory and verification of the caching loader based on the digital certificate. Upon downloading and installation of the caching loader, execution of the processor-readable firmware instructions thereof by the processor causes (i) communication, via the network interface, with a remote firmware server, (ii) identification of one or more firmware applications stored on the firmware server and needed by the client device but not stored thereon, (iii) downloading for storage, in the nonvolatile memory, of the identified firmware application(s), (iv) verification of the identified firmware application(s) based on the digital certificate, (v) identification of one or more newer versions of the firmware application(s) following initial download thereof, and (vi) management of the transition, on the thin client device, to the downloaded newer versions of the firmware application(s).

Yet another aspect pertains to a firmware server for providing firmware to a thin client device. The server includes a processor, memory storing a caching loader and one or more firmware applications, a database of authorized clients, and a network interface. The processor is responsive to a request received via the network interface from a base loader installed on the client device, the processor being configured to (i) query the database of authorized clients based on the request to determine whether the thin client device is an authorized client, (ii) if so, cause transmission of the caching loader via the network interface to the client device for installation thereon, and (iii) in response to a request received via a network interface from the caching loader installed on the client device, cause transmission of the at least one firmware application via the network interface to the client device.

BRIEF DESCRIPTION OF THE DRAWINGS

In the following, various embodiments of the invention are described with reference to the accompanying drawings, in which:

FIGS. 2A-1 and 2A-2 provide a flow chart illustrating a method for initial system setup using base and caching loaders to download and install firmware in accordance with various embodiments.

DETAILED DESCRIPTION

Figure 1:
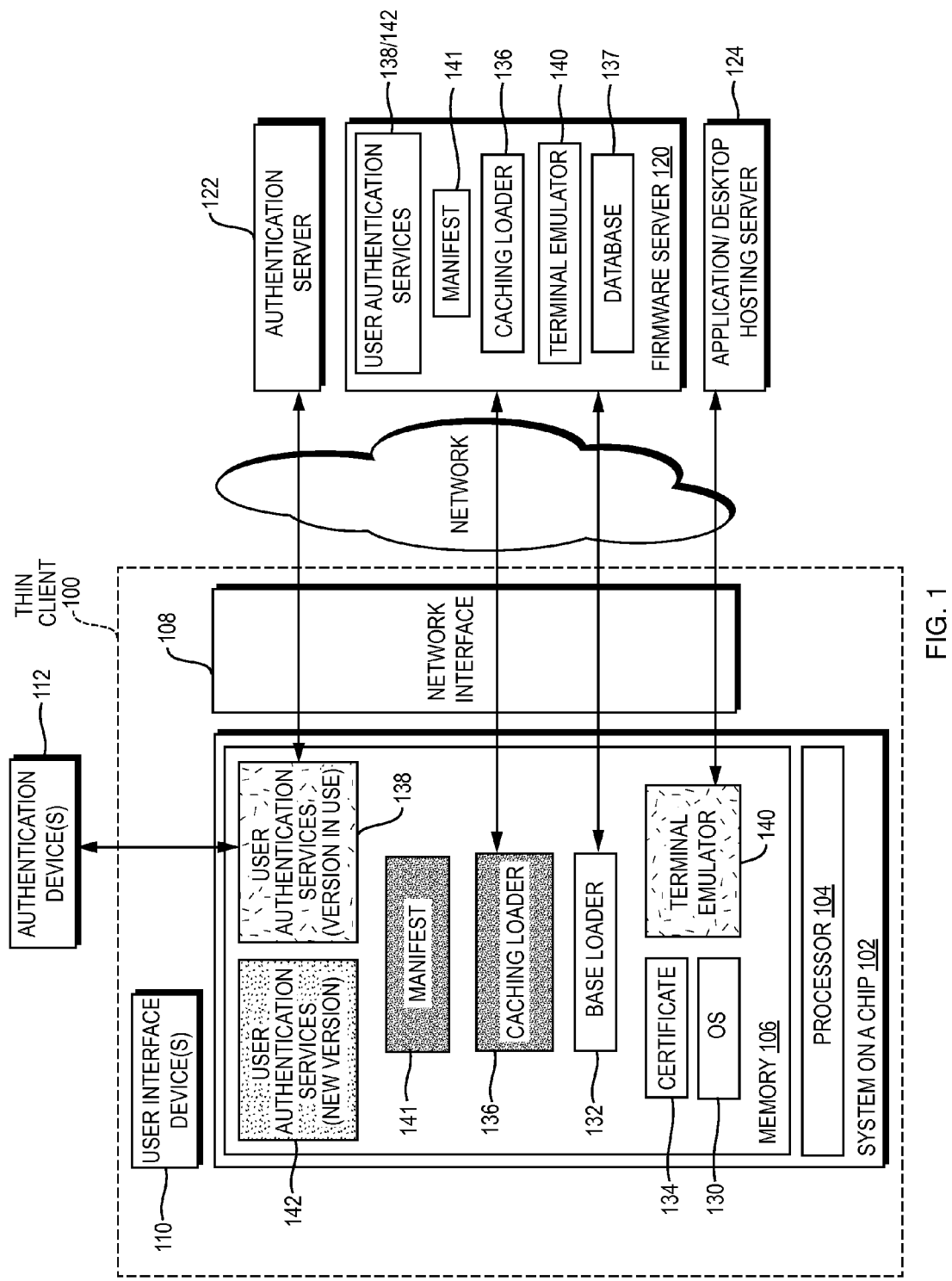
FIG. 1 is a schematic block diagram illustrating, within a network, a thin client device with a two-stage firmware loader in accordance with various embodiments.

FIG. 1 illustrates an exemplary implementation of a thin-client architecture with a two-stage firmware loader in accordance herewith. The thin client device 100 includes a system-on-chip 102 with a processor 104 and writable, nonvolatile memory 106 (e.g., EPROM or flash memory) storing firmware, as well as, connected to the system-on-chip 102, a network interface 108 and one or more peripheral devices 110 for user input and/or output (e.g., a display screen, keyboard, and/or mouse). Further, an authentication device 112 (such as, e.g., a fingerprint reader, contact smartcard reader, or radio-frequency identification (RFID) proximity reader), or multiple such devices for strong, multi-factor user authentication, may be included with or connected to the thin client 100. The network interface 108 facilitates communication between the thin client 100 and various servers, such as a firmware server 120, an authentication server 122, and an application/desktop hosting server 124. For instance, the network interface 108 may be or include an adapter, modem, or other network-interface device that establishes a wired or wireless connection to the Internet, a wide-area network (WAN), local-area network (LAN), intranet, extranet, Ethernet, or any other system for network communications; suitable communications protocols include, e.g., the Transmission Control Protocol/Internet Protocol (TCP/IP), the User Datagram Protocol (UDP), and the Open Systems Interconnection (OSI) standard.

When initially delivered by the hardware vendor, the memory 106 of the thin client device 100 typically includes certain conventional embedded firmware components, at the minimum a base operating system (OS) 130, a base loader 132, and a digital certificate 134, as shown in FIG. 1. The operating system 130 may, for instance, be LINUX, ANDROID, or any other real-time system supporting the underlying hardware. During system set-up, the SOC 102 is configured with relevant environment information such as the IP address of the firmware server 120 to facilitate communication between the server 120 and the base loader 132. During boot-up, the base loader 132 automatically launches, and—using conventional program routines—establishes a connection with the firmware server 120 (via the network interface 108), satisfies the server's authorization protocols, and directs the operating system 130 to download a caching loader 136 provided on the firmware server 120. The firmware server 120 may include a database 137 of authorized client devices, which it queries upon receipt of a request from the base loader 132; transmission of the caching loader 132 (and subsequently downloadable firmware applications) may then be limited to devices that are listed in the database. Following download and installation of the caching loader 136, the base loader 132 launches the caching loader 136 (again using conventional program routines); thereafter, the base loader 132 may shut down. The caching loader 136, likewise executing conventional programming routines, then connects to the firmware server 120 (satisfying the server's authorization protocols) to initially download the required firmware applications that are not pre-installed on the thin client 100 (e.g., UAS application 138 and, in some embodiments, one or more terminal-emulation programs 140); the applications intended to be on the thin client device 100 may be specified in a manifest 141 also downloadable, by the caching loader 136, from the firmware server 120. The caching loader may also periodically check for updates to application packages (or continuously "listen" for messages indicating the availability of updates), and download and install the newer versions (such as UAS firmware 142). Alternatively, updates may be "pushed" to the thin client 100 using server-side push technologies such as Web Sockets. To avoid disruption when transitioning to a newer version of any application, the downloaded new version is generally not deployed immediately, but installed in a separate directory, such that two (or more) versions of the same application (e.g., UAS application versions 138, 142) are simultaneously stored in memory 106. The switch to the newer version may take place at a time when it does not cause, or causes only minimal, disruption to the user(s) of the thin client device 100. In general, the chief function of the base loader 132 is to establish communication with the firmware server 120 and to cause secure, verified download of the caching loader 136 therefrom. The caching loader 136 has an ongoing system role of periodically, or upon receipt of a trigger (e.g., from the firmware server 120 or from the hardware supplier), causing secure, verified download of new firmware from the firmware server 120 and deployment thereof on the thin client at a non-disruptive time.

The terminal-emulator firmware or software 140 (whether pre-installed on the SOC 102 or downloaded and installed by the caching loader 136) interface, via the network, with the application/desktop hosting server 124, and support the network/display protocols associated with different applications or desktop-hosting environments. The UAS firmware 138 interfaces with the local attached authentication device(s) 112 in order to establish the identity of the user and grant controlled access to the thin client device 100 only to valid users (walk-up security); determine the appropriate host resource (e.g., a remotely run desktop or application) based on the user's identity, and broker the connection with the back-end server hosting that resource (e.g., the application/desktop hosting server 124); initiate the proper terminal-emulation program 140 to make the connection and allow access to the server session; monitor the authentication device(s) 112 in case they are used also to lock and/or disconnect from the back-end server (124) for walk-away security; and support re-authentication requests generated by hosted applications that need to validate the identity of the user for specific types of transactions (such as, e.g., submitting a prescription order.) Rule-based logic may be used to select the appropriate terminal-emulation program 140, the proper server 124 to connect with, and the state of the initial applications based on factors such as the identity of the user, the role of the user, the location of the user, the type of device running the application, and the security policy in effect.

In various embodiments, the firmware packages on the firmware server 120 (including the caching loader 136) are digitally signed to ensure their authenticity and integrity. The base loader 132 or caching loader 136 validates each package, usually following download prior to installation, by verifying that the digital signature on the package matches the digital certificate 134 stored on the thin client device 100. As used herein, the term "digital certificate" refers to any secure form of transactional identity verification, which is typically based on a cryptography infrastructure. A digital certificate may employ a public-key scheme in accordance with, for example, the X.509 standard.

Figures 1, 2A:
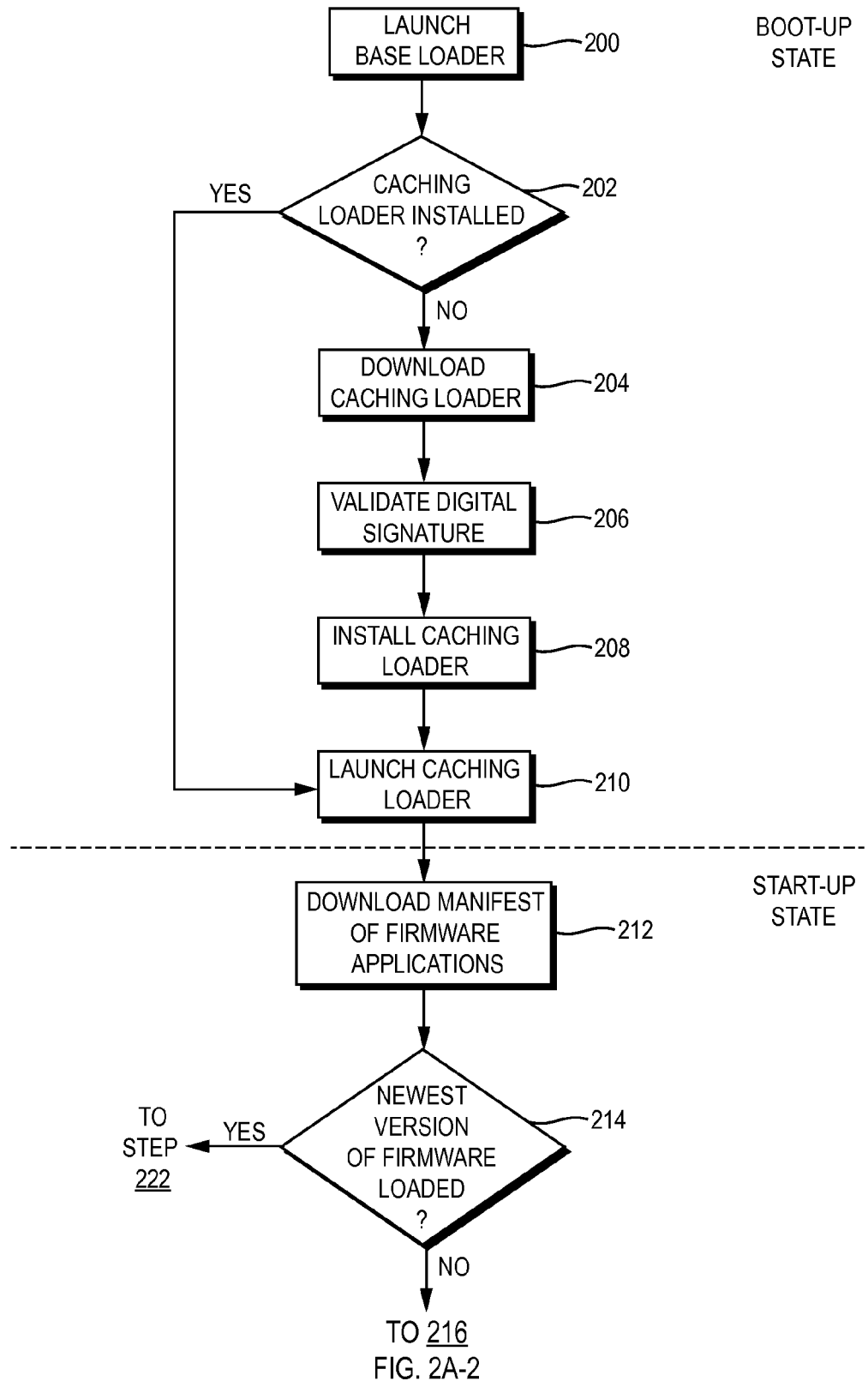
Figures 2, 2A:
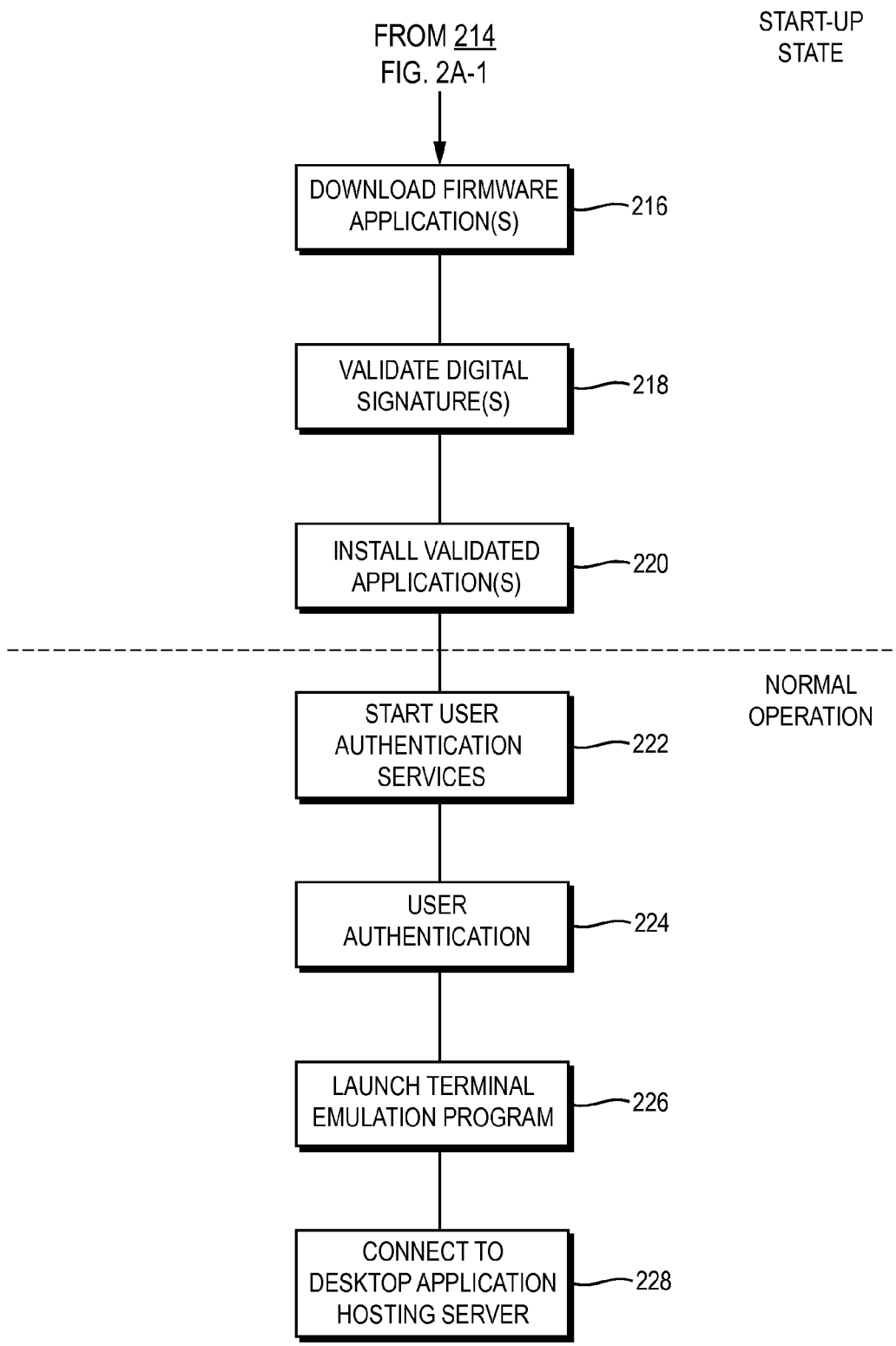

FIGS. 2A-1, 2A-2 and 2B illustrate how the representative architecture depicted in FIG. 1 may operate. Referring to FIG. 2A, on power-up of the thin client device 100, the base loader 132 automatically launches (step 200), and first checks whether the caching loader 136 is already stored on the device (step 202). In first-time power-up state, either "out of the box" or following a reset to factory settings, that is typically not the case. Accordingly, the base loader 132 performs (i.e., causes system-level resources to perform) a first-time download of the caching loader 136 (step 204), verifying the signature of the downloaded content with the digital certificate 134 (step 206) and causing the caching loader 136 to be installed in the writable, persistent memory 106 on the SOC (step 208). The system then enters the start-up state by launching the caching loader 136 (step 210); the base loader 132 may, thereafter, shut down. If the base loader 132 finds a caching loader 136 already installed on the device 100, the base loader 132 launches the caching loader 136 and terminates its own execution (after the caching loader is running). (In the event that the user forces a factory reset of the firmware and wipes out everything, including the caching loader 136 and all downloaded firmware, the base loader 132 starts up fresh and downloads the caching loader 136 as described above.)

In the start-up state, the now-operative caching loader 136 establishes communication with the firmware server 120 to identify and download firmware applications needed by the client device 100, but not yet stored thereon; these applications may include, e.g., the UAS application 138 and/or terminal-emulation program 140. In some embodiments, the caching loader 136 first downloads a manifest 141 from the firmware server 120 to determine what packages are supposed to be on the device (step 212); this manifest 141 may be customer and/or device-dependent so that only relevant packages are downloaded by the caching loader 136. The caching loader 136 then checks whether the required packages have already been loaded and whether a newer version is available on the firmware server 120 (step 214). If, for any application, no version has been loaded (e.g., upon first-time time power-up either out of the box or following a factory reset), or if a newer version is available on the server 120 but has not been downloaded, the caching loader 136 typically downloads the new package from the firmware server 120 and stores it in the SOC memory 106 (step 216). The verification process used by the base loader is now used by the caching loader to verify the integrity of the downloaded package(s) (step 218); that is, the caching loader 136 verifies the downloaded material using the digital certificate 134 included with the base loader 136. The downloaded and validated package is then installed (step 220). If one or more older versions of an application (such as the UAS) already exist on the SOC 102, the caching loader 136 may, alternatively to downloading the newest version, run a specific version of the firmware application even if a later version is available on the firmware server 120 or already cached on the SOC 102.

Once all firmware applications specified in the manifest 141 (or their newest versions) have been installed, the system goes into normal operation, starting up the firmware application(s) as needed. In various embodiments, the caching loader starts up the UAS application 138 (step 222), which displays the user log-in screen, ready for the user to log in. The UAS application 138 monitors the authentication device(s) 112 for user events such as tapping a proximity card or touching a finger to a biometric device. Upon successful user authentication (step 224), the UAS application 138 downloads from the server 122 responsible for user authentication the policy in effect for the user/machine and launches the terminal emulation program 140 (step 226) to connect with the appropriate remote application or desktop hosting server 124 (step 228). The authentication server maintains records of users, devices, locations, policies, and applications. In addition, the hosted-application server 124 may also enforce its own policies regarding user rights, choice of application to run, etc. based on similar parameters.

Figure 2B:
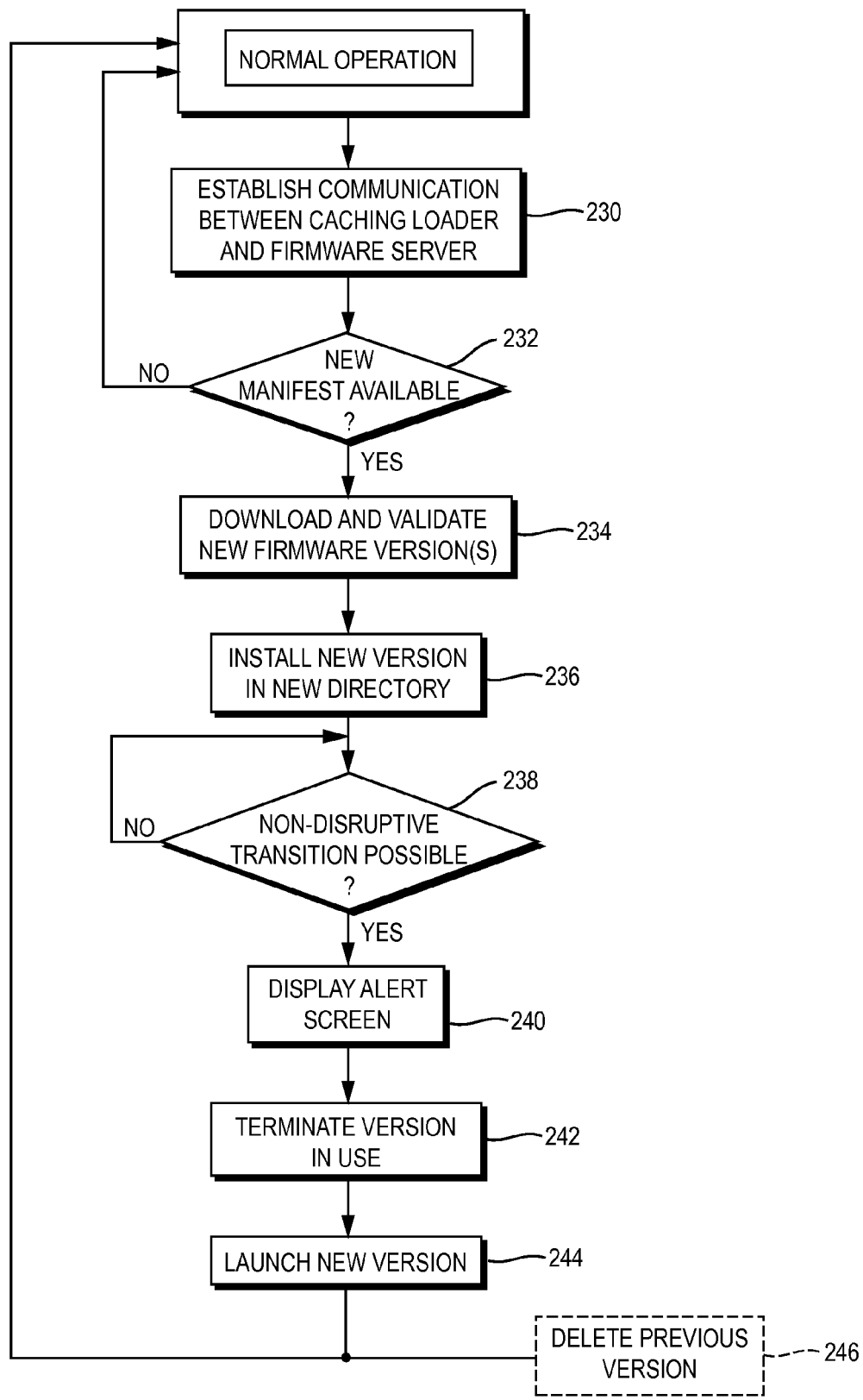
FIG. 2B is a flow chart illustrating a method for updating firmware using a caching loader in accordance with various embodiments.

Referring now to FIG. 2B, during use of the thin client device 100, the caching loader periodically communicates with the firmware server 120 (step 230) to determine whether a newer manifest 141 is available (step 232). If so, the contents of the manifest 141 are used to determine which package(s) require updating (or which additional packages require downloading). (Alternatively to using a manifest 141, the caching loader 136 may simply check for newer versions of firmware applications used by the client device 100. In still other embodiments, the caching loader 136 passively awaits notification from the firmware server or from the hardware supplier that new firmware is available for download.) The caching loader 136 then downloads any new packages (step 234), again validating them with the digital certificate 134. The "ping" rate is set by server policy to reduce the loading effect on the firmware server 120. To prevent overloading the server 120 with too many concurrent requests, the caching loader 136 may self-adjust the downloading rate based on response times from the firmware server 120, and wait longer if the server 120 is slow.

Upon successful download of a new package, the caching loader typically installs the package into a newly created directory on the device 100 to isolate it from the directory of any previous version (step 236). (All resources used by a package are typically located within a single directory to minimize cross-version interference.) When the package is completely installed, it is ready to replace the existing version, but the actual transition is not made by the caching loader 132 until this can be done seamlessly with minimal downtime and user disruption, e.g., as determined by the UAS application 138 (step 238) based on a suitable update policy. In cases where the UAS application 138 itself is being replaced, scheduling the transition between versions can be particularly stringent. Furthermore, scheduling is important in environments, such as hospitals, that operate continuously, with no scheduled downtime; in such environments, the objective is generally to minimize disruption to end users. The UAS application 138 may determine the optimum transition time by monitoring the state of the terminal emulation program 140 to check whether there are active sessions in use or the system is, instead, in a logged-off state awaiting a new user. The update policy may be configured such that the transition occurs, for example, only between certain times of the day or certain days of the week; when no log-on activity has occurred during a pre-set interval; when the rate of new log-ons within a time window falls below a pre-set threshold; immediately following the termination of a user session; or—for very important updates—immediately, regardless whether a user session is active or not. As soon as the policy criteria are satisfied, the caching loader 132 manages the transition to the new version using conventional deployment routines in conjunction with the client operating system.

Switching from using the older version of an application (e.g., current UAS version 138) to the newly downloaded version (e.g., UAS version 142) may be accomplished without a system reboot, and may involve first displaying an alert screen indicating that the switch is about to take place (step 240). The alert screen occludes the screen transitions that take place "underneath": termination of the existing version (step 242) and start-up of the new version (step 144) by the caching loader 136. Finally, the alert screen is removed or dissolves into the new application screen (e.g., a new log-in screen) (step 246). The older version of the application may now be deleted (step 244), or kept in the SOC memory 142 for possible rollback.

The foregoing approach offers numerous advantages over traditional static firmware. It allows the hardware vendor to ship the thin-client device 100 with a stable and simple base loader 102 that need not be changed for the life of the device (although the possibility to update the base loader is not excluded by the present invention), but at the same time allow important firmware applications to be automatically updated as needed. In particular, components used to support hosted computing can be updated in the background in a secure, transparent manner, and then cut over with minimal disruption to the user. Two-level caching allows the behavior of the caching loader 136 to be updated independently of other firmware application packages. The caching loader 136 can manage the state of the UAS application as well as other firmware used to interface with the user. Finally, application customization can be supported by either customers or vendors following hardware purchase by uploading customized firmware onto the firmware server 120 for subsequent download to the thin client 100.

As will be readily understood by one of skill in the art, the base and caching loaders 132, 136, as well as other firmware components described above, may be implemented by computer-executable instructions (including, e.g., routines, programs, objects, components, data structures, etc. that perform particular tasks or implement particular data types) that are executed, e.g., by a conventional computer processor. The instructions may be programmed in any suitable programming language, including, without limitation, assembly language, Ada, APL, Basic, C, C++, C*, COBOL, dBase, Forth, FORTRAN, Java, Modula-2, Pascal, Prolog, Python, REXX, and/or JavaScript, for example. Further, it is not necessary that a single type of instruction or programming language be utilized in conjunction with the operation of the system and method of the invention. Rather, any number of different programming languages may be utilized as is necessary or desirable.

Further, those skilled in the art will appreciate that the processing units that execute the commands and instructions (including processors 104 on client devices 100 as well as processors utilized by the servers 120, 122, 124) may be general-purpose processors, but may alternatively utilize any of a wide variety of other technologies including special-purpose hardware, a microcomputer, mini-computer, mainframe computer, programmed microprocessor, microcontroller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices that is capable of implementing the steps of the processes of the invention.

Also, the servers (e.g., servers 120, 122, 124) may be implemented using any number of various computer system configurations, including multiprocessor systems, microprocessor-based or programmable consumer electronics, mini-computers, mainframe computers, and the like. In some embodiments, the servers each comprise or consist of a general-purpose computing device in the form of a computer including a processing unit, a system memory, an interface for wireless and/or wired network communications, optionally an interface facilitating wireless cell phone communications via telecommunication carriers, and a system bus that couples the various system components. The servers may also be realized in distributed computing environments where tasks are performed by remote processing nodes linked through a communication network.

The thin client 100, as well as the servers 120, 122, 124, may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

Although the invention has been described herein with respect to specific embodiments and details, various modifications, alternative embodiments, and different combinations of features that still solve the problems addressed by the invention in a similar manner will be readily apparent to a person of skill in the art, and are understood to be within the scope of the invention.

What is claimed is:

1. A thin client device comprising:
   at least one peripheral device facilitating interaction with a user;
   a processor;
   a network interface;
   at least one authentication device for authentication of the user;
   a user authentication services application for execution by the processor to authenticate the user via the at least one authentication device;
   a program executable by the processor to establish communication, via the network interface, with a remote application-hosting server for facilitating interaction, via the peripheral device, with at least one application executing on the remote application-hosting server, the user authentication services application restricting operation of the program prior to authentication of the user via the at least one authentication device; and
   writable, nonvolatile memory for storing a digital certificate and firmware instructions executable by the processor, the firmware instructions defining:
   (i) a caching loader which, when executed by the processor, causes (A) communication, via the network interface, with a remote firmware server, (B) identification of at least one firmware application needed by the client device but not stored thereon, (C) downloading for storage, in the nonvolatile memory, of the at least one identified firmware application, (D) verification of the at least one identified firmware application based on the digital certificate, (E) identification of at least one newer versions of the at least one identified firmware application following initial download thereof, (F) management of transition, on the thin client device, to the downloaded at least one newer version of the at least one identified firmware application, and
   (ii) a self-launching base loader which, when executed by the processor, causes (A) communication, via the network interface, with the remote firmware server, (B) downloading for storage, in the nonvolatile memory, of the caching loader, and (C) verification of the caching loader based on the digital certificate.

2. The thin client device of claim 1, wherein the caching loader, when executed by the processor, further causes downloading of a manifest from the firmware server, the identification of the at least one firmware application needed by the thin client device being based at least in part on the manifest.

3. The thin client device of claim 1, wherein the at least one authentication device comprises at least one of a fingerprint reader, a card reader, or an RFID reader.

4. The thin client device of claim 1, wherein the caching loader is configured to manage the transition to the downloaded at least one newer version of the at least one identified firmware application by restricting deployment of the at least one newer version and override of a corresponding at least one previous version in accordance with a policy.

5. The thin client device of claim 4, wherein the policy requires the transition to occur only between specified times of the day or specified days of the week.

6. The thin client device of claim 4, wherein the policy requires the transition to occur only when no log-on activity has occurred during a pre-set interval or when the rate of new log-ons within a time window falls below a pre-set threshold.

7. The thin client device of claim 4, wherein the policy requires the transition to occur immediately following the termination of a user session.

8. The thin client device of claim 1, wherein the caching loader is configured to cause the transition to the downloaded at least one newer version of the at least one identified firmware application by displaying an alert screen, shutting down a previous version of the at least one identified firmware application, and thereafter starting the newer version.

9. A method of managing firmware on a thin client device, the thin client device comprising a processor and at least one authentication device, the method comprising:
   executing, by the processor, a base loader stored in nonvolatile memory of the thin client device to download, from a remote firmware server, a caching loader for nonvolatile storage on the thin client device;
   executing, by the processor, the caching loader to
   (i) identify, via the remote firmware server, at least one firmware application needed by the thin client device but not stored thereon and download the at least one identified firmware application for nonvolatile storage on the thin client device;
   (ii) verify the at least one identified firmware application based on a digital certificate;
   (iii) identify, via the remote firmware server, at least one newer version of the at least one identified firmware application following initial download thereof and download the at least one newer version of the at least one identified firmware application for storage in the nonvolatile memory;
   (iv) verify the at least one newer version based on the digital certificate; and
   (v) manage transition to the at least one downloaded newer version of the at least one firmware application;
   executing a user authentication services application to authenticate a user via the at least one authentication device; and
   executing a program on the thin client device to establish communication with a remote application server for facilitating interaction between a user of the thin client device with at least one application executing on the remote application server, operation of the program being restricted prior to authentication of the user.

10. The method of claim 9, wherein the caching loader identifies the at least one newer version of the at least one identified firmware application by downloading a manifest from the remote firmware server.

11. The method of claim 9, wherein managing the transition to the at least one downloaded newer version of the at least one identified firmware application comprises restricting deployment of the at least one newer version and override of a corresponding at least one previous version of the at least one identified firmware application in accordance with a policy.

12. The method of claim 11, wherein the policy requires the transition to occur only between specified times of the day or specified days of the week.

13. The method of claim 11, wherein the policy requires the transition to occur only when no log-on activity has occurred during a pre-set interval or when the rate of new log-ons within a time window falls below a pre-set threshold.

14. The method of claim 11, wherein the policy requires the transition to occur immediately following the termination of a user session.

15. The method of claim 9, wherein managing the transition to the at least one downloaded newer version of the at least one identified firmware application comprises displaying an alert screen, shutting down a previous version of the at least one identified firmware application, and thereafter starting the newer version.

16. A system for managing firmware on a thin client device, the system comprising:
 a firmware server storing (i) a caching loader comprising processor-readable firmware instructions, and (ii) at least one firmware application; and
 a client device comprising
   (i) at least one peripheral device facilitating interaction with a user,
   (ii) a processor,
   (iii) a network interface,
   (iv) an authentication device,
   (v) a user authentication services application for execution by the processor to authenticate the user via the authentication device,
   (vi) a program executable by the processor to establish communication, via the network interface, with a remote application-hosting server for facilitating interaction, via the at least one peripheral device, with at least one application executing on the remote application-hosting server, the user authentication services application restricting operation of the program prior to authentication of the user via the authentication device, and
   (vii) writable, nonvolatile memory storing (A) a digital certificate and (B) a self-launching base loader comprising processor-readable firmware instructions which, when executed by the processor, cause communication, via the network interface, with the firmware server and facilitate downloading of the caching loader for storage in the nonvolatile memory and verification of the caching loader based on the digital certificate,
 wherein, upon downloading and installation of the caching loader, execution of the processor-readable firmware instructions thereof by the processor causes (i) communication, via the network interface, with a remote firmware server, (ii) identification of at least one firmware application stored on the firmware server and needed by the client device but not stored thereon, (iii) downloading for storage, in the nonvolatile memory, of the at least one identified firmware application, (iv) verification of the at least one identified firmware application based on the digital certificate, (v) identification of at least one newer version of the at least one identified firmware application following initial download thereof, and (vi) management of transition, on the thin client device, to the at least one downloaded newer version of the at least one identified firmware application.

17. The system of claim 16, wherein the processor-readable firmware instructions, when executed by the processor, further cause downloading of a manifest from the firmware server, the identification of the at least one firmware application needed by the client device being based at least in part on the manifest.

18. The system of claim 16, wherein the authentication device comprises at least one of a fingerprint reader, a card reader, or an RFID reader.

19. The system of claim 16, wherein the caching loader is configured to manage the transition to the at least one downloaded newer version of the at least one identified firmware application by restricting deployment of the at least one newer version and override of a corresponding at least one previous version in accordance with a policy.

20. The system of claim 19, wherein the policy requires the transition to occur only between specified times of the day or specified days of the week.

21. The system of claim 19, wherein the policy requires the transition to occur only when no log-on activity has occurred during a pre-set interval or when the rate of new log-ons within a time window falls below a pre-set threshold.

22. The system of claim 19, wherein the policy requires the transition to occur immediately following the termination of a user session.

23. The system of claim 16, wherein the caching loader is configured to manage the transition to the at least one downloaded newer version of the at least one identified firmware application by displaying an alert screen, shutting down a previous version of the at least one identified firmware application, and thereafter starting the newer version.

* * * * *